March 31, 1931.  W. C. MORAN  1,798,948
TESTING MACHINE
Filed April 21, 1926  6 Sheets-Sheet 1

INVENTOR
William C. Moran,
BY
ATTORNEYS

March 31, 1931.  W. C. MORAN  1,798,948
TESTING MACHINE
Filed April 21, 1926    6 Sheets-Sheet 2

INVENTOR.
William C. Moran
BY
ATTORNEYS

March 31, 1931. W. C. MORAN 1,798,948
TESTING MACHINE
Filed April 21, 1926 6 Sheets-Sheet 3

INVENTOR.
William C. Moran
BY
ATTORNEYS

March 31, 1931.  W. C. MORAN  1,798,948
TESTING MACHINE
Filed April 21, 1926   6 Sheets-Sheet 6

INVENTOR:
William C. Moran,
BY
ATTORNEYS.

Patented Mar. 31, 1931

1,798,948

UNITED STATES PATENT OFFICE

WILLIAM C. MORAN, OF LAUREL SPRINGS, NEW JERSEY, ASSIGNOR TO RIEHLE BROS. TESTING MACHINE COMPANY, OF PHILADELPHIA, PENNSYLVANIA, A CORPORATION OF PENNSYLVANIA

TESTING MACHINE

Application filed April 21, 1926. Serial No. 103,524.

My invention relates to a new and useful improvement in testing machines and it relates more particularly to a novel variable speed power transmission device in testing machines, whereby the load may be applied to the specimen mounted in the machine, at a relatively large number of different speeds, and whereby the change in the rate of travel of the movable clamping head or draw head, may be effected with great ease and facility, and while the specimen is still under load.

With the above ends in view, my invention consists of a testing machine having a stationary and a movable specimen support, the former supported by one end of a weighing mechanism, while the latter is carried and adapted to be actuated by a plurality of load screws.

My invention further consists of a series of meshed gears interconnecting said plurality of load screws and terminating in a worm gear, a worm in mesh with said worm gear, carried by a driving or worm shaft of a power transmission system of my novel construction, and an electric motor permanently connected with the driven shaft of said power transmission system.

My invention further consists of a novel system of alternative trains of gears interposed between said load screws and worm on one hand and said driven shaft and electric motor on the other, whereby said driven shaft and said load screws may be operatively connected at any one of several speed ratios at will.

My invention consists more particularly of a testing machine having a movable specimen support or head, a series of load screws adapted to actuate said head, meshed gears interconnecting said load screws and including a worm gear, a worm in mesh with said worm gear, carried by a driving or worm shaft, a driven or motor shaft, a counter shaft, double set of gears and corresponding clutches intermediate said driven or motor shaft and said counter shaft, operatively to interengage the latter with the former in either forward or reversed direction at will, a suitable clutch actuating lever, adapted to operate said clutches, a plurality of alternative and parallel train of gears intermediate said counter shaft and said driving or worm shaft, normally in an inoperative or disengaged condition, a clutch in each of said alternative trains of gears, adapted operatively to interconnect said counter shaft with said driving or worm shaft, through any one of the several alternative trains of gears; each of said trains of gears having a different speed ratio, and a selective clutch actuating mechanism adapted to control each of said clutches in said alternative parallel trains of gears, having a single operating handle adapted to actuate said selective mechanism, thereby to actuate any one of said several clutches, at will.

My invention further consists of novel construction in a clutch elective mechanism adapted to be operated by a single lever whereby any one of a series of clutches may be operated at will, and whereby no more than one of the several clutches may be in engagement at any one time, thus insuring against damage to either clutches or gearing, or undue strain upon the machine as a whole.

For the purpose of illustrating my invention, I have shown in the accompanying drawings forms thereof which are at present preferred by me since they will give in practice satisfactory and reliable results, although it is to be understood that the various instrumentalities of which my invention consists can be variously arranged and organized and that my invention is not limited to the precise arrangement and organization of these instrumentalities as herein shown and described.

In the accompanying drawings:—

Referring to the drawings, in which like reference characters indicate like parts, 1 designates a testing machine having a stationary table or specimen support 2 carried by one end of a train of weighing levers 3, 4 and 5, terminating in the scale beam 6, at the other end, which carries a poise 7. A movable head or specimen support 8, is carried by a series of load screws 9 threaded therethrough, each carrying a gear 10 at the lower end thereof, which are operatively connected with a common pinion 11, carried by the shaft 12. The shaft 12 carries a worm gear 13 at the lower end thereof which is in mesh with a worm 14 carried by the driving or worm shaft 15, which is journalled in the bearings 16 and 17 carried by the housing 18. The driving or worm shaft 15 carries a gear 19 at the other end thereof which is in mesh with one of the gears of the series of alternative trains of gears.

My novel testing machine further includes a motor or driven shaft 20, journalled in the bearings 21 and 22, carried by the housing 18, to the outer end 23 of which is connected a source of power, such as an electric motor 24, by means of suitable coupling 25. The motor or driven shaft 20 may be constantly revolved, while the testing machine is in use.

The counter shaft 26, journalled in the bearings 27 and 28 at its two ends, extends parallel to the motor shaft 20, and carries a pair of loose gears 29 and 30. The gear 30 is directly in mesh with a pinion 31 fixedly carried by the motor shaft 20, while the gear 29 is in mesh with an idle gear 32, operatively interposed between a pinion 33, also fixedly carried by the motor shaft 20, and said gear 29, in order to impart to the gear 29 a rotary motion in a direction opposed to the direction of the rotation of the gear 30.

Figure 3:
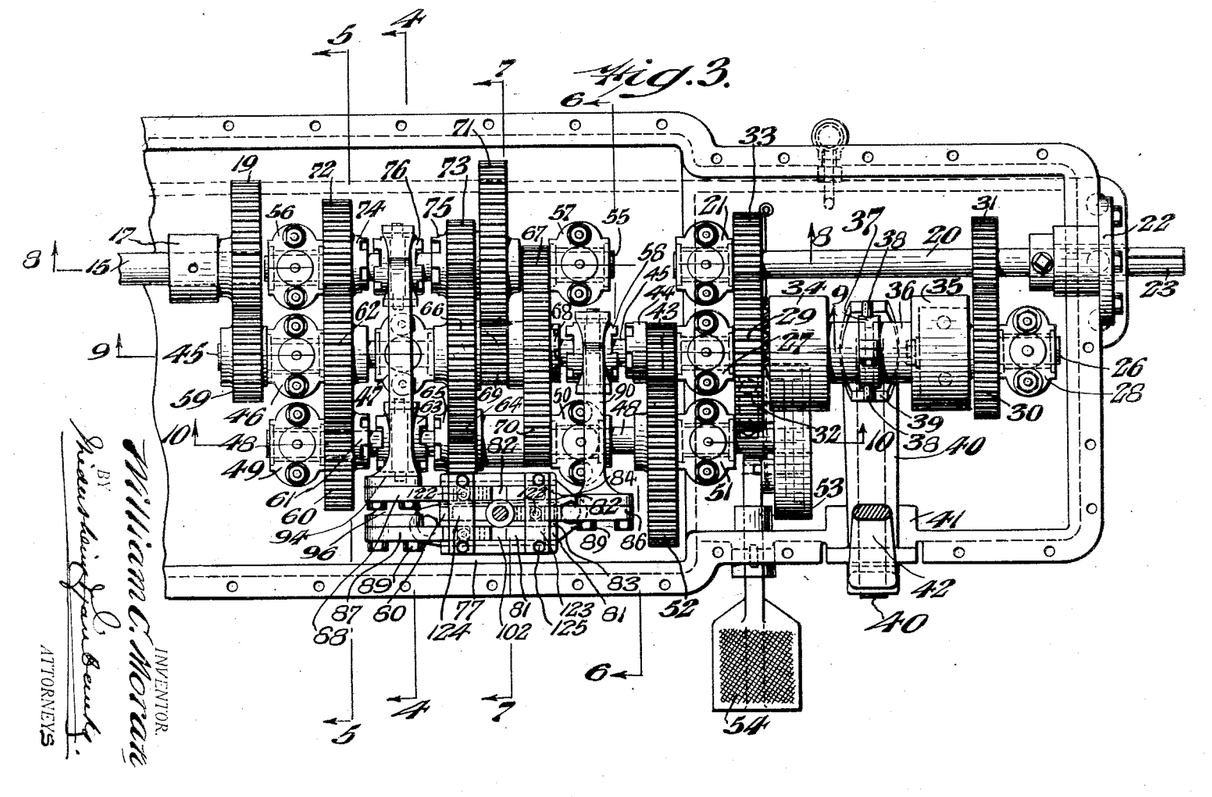
Figure 3 represents a top plan view of the same.
Figure 4:
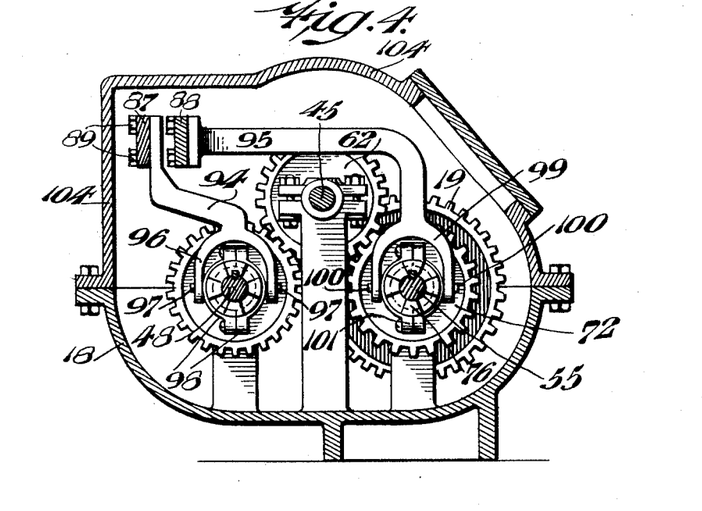
Figures 4, 5, 6 and 7 represent in similar transverse sections on lines 4—4, 5—5, 6—6 and 7—7 respectively, taken on Figure 3, showing the details of the alternative parallel trains of gears and the selective clutch actuating mechanism.
Figure 5:
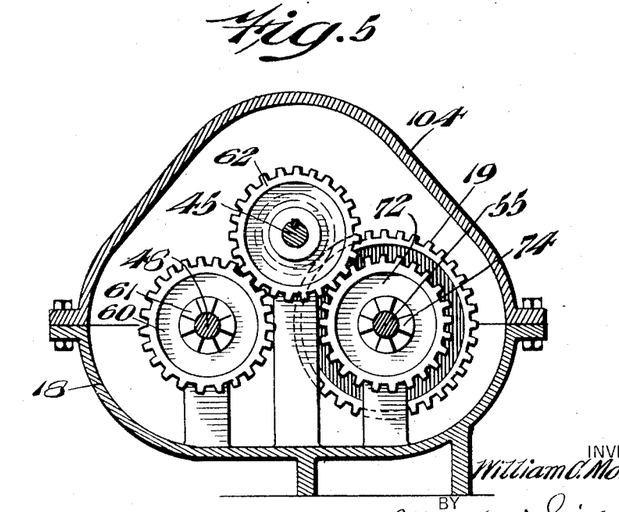

Each of the gears 29 and 30 carry corresponding clutches 34 and 35 respectively. A common clutch actuating collar or sleeve 36 is keyed to the counter shaft 26 and is adapted to actuate either one of the clutches 34 or 35, when urged in either direction respectively by a suitable thrust collar 37. The thrust collar 37 is rotatably mounted upon the sleeve 36, as shown in Figure 3, and carries diametrically opposed trunnions 38, which are engaged by a clutch fork 39 carried by a shaft 40, which latter extends outwardly through a bearing 41 and carries an operating lever or handle 42, at its outer end; whereby said clutch actuating sleeve 36 may be shifted into either of its two opposed operative positions by the corresponding movement of the actuating lever 42, thereby imparting to the counter shaft 26 a rotary motion in either one of the corresponding opposed directions.

Figure 9:
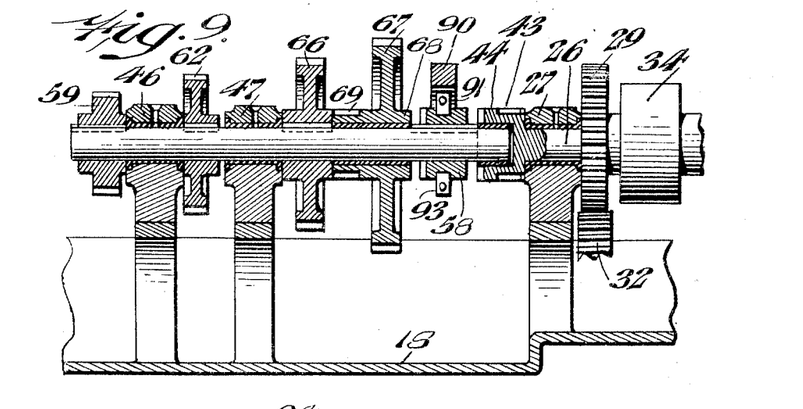
Figure 10:
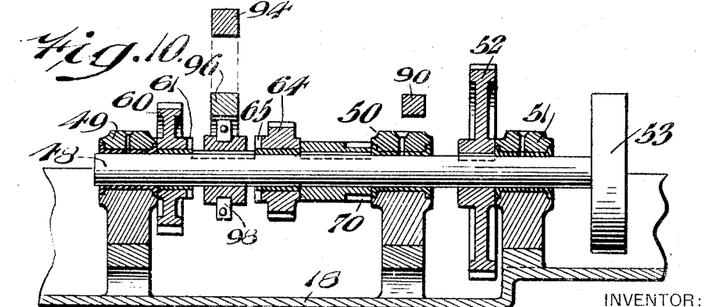

To the inner end of the counter shaft 26 is fixedly secured a pinion 43 and a suitable toothed clutch member 44. The clutch member 44 is provided with a central bearing opening, suitably bushed to provide a bearing and support for the end of the shaft 45, as shown particularly in Figure 9. The shaft 45 is also journalled in the bearing 46 near the opposed end thereof and in the bearing 47 intermediate of its ends. A second shaft 48, journalled in the bearings 49, 50 and 51, is permanently interconnected with the counter-shaft 26, by means of a gear 52 fixedly secured to said shaft 48 and in mesh with said pinion 43. Thus, the countershaft 26 and the shaft 48 are always revolved in unison.

To the inner end of the shaft 48 is secured a brake drum 53, in which is mounted any suitable brake shoe and actuating mechanism therefor, not shown in detail in the drawings, which is adapted to be actuated by a foot pedal 54. By this means, the travel of the head or movable specimen support of the testing machine may be stopped very quickly and with great precision, at any point desired, during a test.

A third shaft 55 is suitably journalled in bearings 56 and 57. Upon the three shafts 45, 48 and 55 are mounted a series of trains of gears which are adapted alternatively to connect the countershaft 26 with the driving or worm shaft 15, each of said trains of gears having a different ratio, so that different rates of travel may be imparted to the head 8 of the testing machine. In the particular embodiment of my invention herein shown, six alternative trains of gears are provided, thus enabling the driving or worm shaft 15 to be driven at six different speeds. For the purpose of illustration, the six different speeds of the driving or worm shaft are 400, 100, 50, 20, 5 and 2½ R. P. M., while the speed of the motor shaft 20 is 1,200 R. P. M. While these speeds are actual working speeds, in a present embodiment of my invention, it is to be understood that any suitable ratios may be provided by the proper proportioning of the various gears of each of the series of trains of gears.

In order to trace through the six different trains of gears from the countershaft 26 to the driving or worm shaft 15, reference is had to the sectional views 4 to 10 inclusive, as well as to Figure 3. The speed ratio between the countershaft 26 and the motor shaft 20 is 2÷3, that is, the countershaft 26 is revolved at a constant speed of 800 R. P. M.

The first or highest speed of 400 R. P. M. at the worm shaft 15, that is, a speed ratio of 1:2 between the worm shaft 15 and the countershaft 26, is obtained by a direct interconnection of the countershaft 26 with the shaft 45. This is obtained by moving the clutch sleeve or collar 58 into engagement with the clutch member 44; said clutch collar 58 being keyed to the shaft 45. This imparts 800 R. P. M. to the shaft 45. To the opposed end of the shaft 45, is fixedly secured a pinion 59, which is constantly in mesh with the gear 19, carried by the worm shaft 15, and bears a speed ratio of 2:1 to said gear 19. Thus a speed of 400 R. P. M. is provided at the worm shaft 15.

The second speed of 100 R. P. M. or a speed ratio of 1:8 between the worm shaft 15 and the counter shaft 26, is obtained through the shaft 48, which revolves in unison with the countershaft 26, through the pinion 43 and the gear 52, as mentioned hereinabove.

A gear 60 is mounted loosely upon the shaft 48 and is provided with a clutch member 61. The gear 60 is in mesh with a gear 62 fixedly secured to the shaft 45, which bears a ratio of 1:1 to said gear 60. The pinion 43 and the gear 52 bearing a ratio of 4:1 to each other, and the pinion 59 and the gear 19 bearing the ratio of 2:1; a net speed ratio of 1:8 is produced between the driving or worm shaft 15 and the countershaft 26, when the clutch sleeve 63 is moved into engagement with the clutch member 61; said clutch sleeve 63 being keyed to the shaft 48.

The third speed of 50 R. P. M., that is, a speed ratio of 1:16 between the worm shaft 15 and the countershaft 26, is thus also obtained through the shaft 48, but in this case, instead of interconnecting the shafts 48, and 45, in the ratio of 1:1 through the gears 60 and 62, as in the previous speed ratio, the two shafts are interconnected at a ratio of 2:1 through a pinion 64 also provided with a clutch member 65 and loosely mounted upon the shaft 48, and a gear 66 fixedly mounted upon the shaft 45, and in mesh with said pinion 64. Thus, for this speed ratio, the clutch sleeve 63 is moved into engagement with the clutch member 65, thus completing the train of gears composed of the pinion 43, gear 52, pinion 64, gear 66, pinion 59 and gear 19.

To obtain the speed of 20 R. P. M. or a speed ratio of 1:40 between the worm shaft 15 and the countershaft 26, there is provided gear 67, having secured thereto a clutch member 68, and being loosely mounted upon the shaft 45, preferably carried by a sleeve, which sleeve also carries a pinion 69 fixedly secured thereto. (Reference will be had to pinion 69 hereinbelow.) The gear 67 is in mesh with a pinion 70 fixedly mounted upon the shaft 48. The speed ratio of the gear 69 and the pinion 70 is 1:5. Thus, by engaging the clutch sleeve 58 with the clutch member 68, interengagement is obtained between the loose gear 67 and the shaft 45, thereby imparting the rotary motion of the countershaft 26 to the shaft 45, through the pinion 43 and the gear 67 in the ratio of 1:5. From the shaft 45 the motion is again transmitted to the driving or worm shaft 15, in a further ratio of 1:2, through the pinion 59 and the gear 19. Thus, by moving the clutch sleeve 58 into engagement with the clutch member 68, the speed ratio of 1:40 is obtained between the driving or worm shaft 15 and the countershaft 26.

The two low speeds of 5 and 2½ R. P. M., or the high speed ratios of 1:160 and 1:320 respectively, between the driving or worm shaft 15 and the countershaft 26, are obtained through the shaft 55, which is also revolved in unison with the countershaft 26, through the pinion 43, gear 52, pinion 70, gear 67, pinion 69 and the gear 71 which is in mesh with the pinion 69 and is fixedly mounted upon the shaft 55. The ratio between the pinion 69 and the gear 71 is 4:1; thus giving a ratio of 1:80 between the shaft 55 and the countershaft 26, or a speed of 10 R. P. M. on the shaft 55. The shaft 55 carries loosely mounted thereon, the two gears 72 and 73, carrying the clutch members 74 and 75 respectively, and a common clutch sleeve 76, keyed thereto and intermediate of said two gears 72 and 73. The gear 72 is in mesh with the gear 62, which, as mentioned hereinbefore, is fixedly mounted upon the shaft 45, and bears a ratio of 1:1 thereto. Thus, by moving the clutch sleeve 76 into engagement with the clutch member 74, a gear train is completed through the shaft 55, the gears 72 and 62 and the pinion 59 and gear 19, the latter of which, as brought out before, bear a ratio of 2:1; thereby producing a ratio of 1:160 between the driving or worm shaft 15 and the counter shaft 26, or a worm shaft speed of 5 R. P. M.

The lowest worm shaft speed of 2½ is obtained by moving the clutch sleeve 76 into engagement with the clutch member 75, thereby completing a gear train from the shaft 55 to the shaft 45, through the gear 73 and the gear 66, which latter gear as brought out hereinbefore, is fixedly mounted on the shaft 55, said gears 73 and 66 bear a ratio of 2:1 to each other. Thus, in this position of the clutch sleeve 76, the ratio of 1:320 is obtained between the driving or worm shaft 15 and the countershaft 26, or a worm shaft speed of 2½ R. P. M.

The following is a tabulation of the six trains of gears, the gears being designated by the same reference numerals used in the drawings:—

| Worm shaft speeds and speed ratios between worm shaft and countershaft | Clutch engagements | Gear trains and corresponding speed ratios between gears in mesh | | | | |
|---|---|---|---|---|---|---|
| 400 R. P. M. | 58-44 | 59-19 | | | | |
| 1:2 100 R. P. M | | 2:1 43-52 | 60-62 | 59-19 | | |
| | 63-61 | | | | | |
| 1:8 50 R. P. M. | | 4:1 43-52 | 1:1 64-66 | 2:1 59-19 | | |
| | 63-65 | | | | | |
| 1:16 20 R. P. M. | | 4:1 43-52 | 2:1 70-67 | 2:1 59-19 | | |
| | 58-68 | | | | | |
| 1:40 5 R. P. M. | | 4:1 43-52 | 5:1 70-67 | 2:1 69-71 | 72-62 | 59-19 |
| | 76-74 | | | | | |
| 1:160 2½ R. P. M. | | 4:1 43-52 | 5:1 70-67 | 4:1 69-71 | 1:1 73-66 | 2:1 59-19 |
| | 76-75 | | | | | |
| 1:320 | | 4:1 | 5:1 | 4:1 | 2:1 | 2:1 |

It is seen from the foregoing, that to complete any one of the several trains of gears, between the countershaft 26 and the driving shaft 15, there is but a single clutch engagement required, that is, but one of the several clutch sleeves 58, 63 or 76 need be shifted into one of their two positions respectively. By my invention there is further provided a novel selective clutch shifting device 77, whereby any one of the several clutch sleeves may be shifted, into either one of their two opposed operative positions by a single actuating lever, and whereby the clutch sleeves are always automatically returned to the neutral or inoperative positions, before another clutch sleeve may be displaced or shifted into an operative position.

Figure 6:
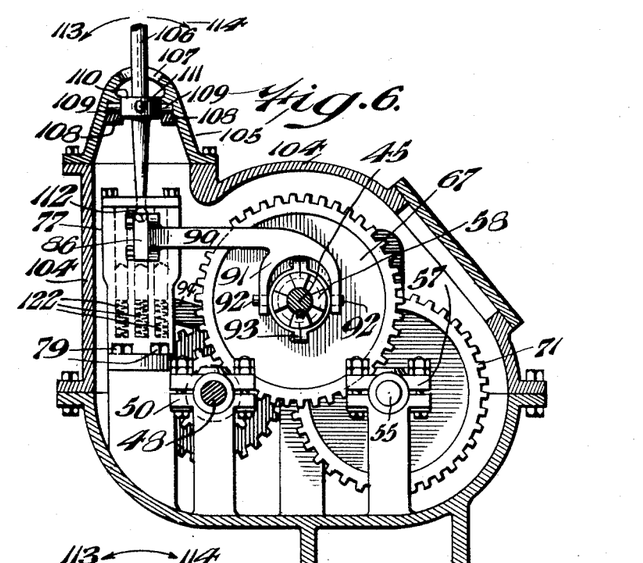
Figure 7:
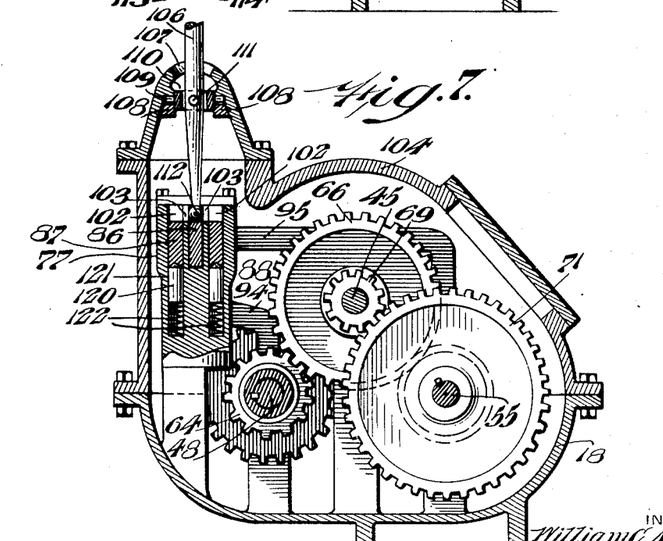
Figure 8:
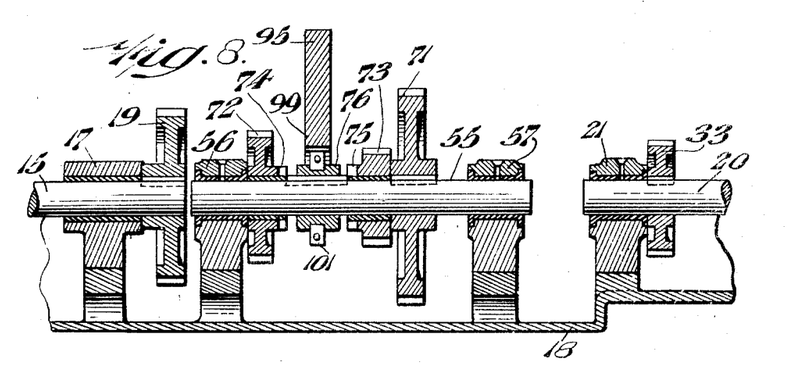
Figures 8, 9 and 10 represent longitudinal sections on lines 8—8, 9—9 and 10—10 respectively taken on Figure 3.

The novel selective clutch shifting device 77, is composed of a housing 78 suitably secured to the main frame 18, by means of the bolts 79, said housing 78 having a series of longitudinal parallel guiding slots 80, 81 and 82, spaced apart a suitable distance, and thus separated by the stationary and rigid walls 83 and 84, as shown particularly in Figures 3, 6 and 7. The slots 80, 81 and 82 correspond to the clutch sleeve 58, 63 and 76 respectively. The guide slots or channels 80, 81 and 82 extend downwardly from the top of the housing 78 to the lower edge 85, and have mounted therein corresponding slides 86, 87 and 88. The slide 86 projects outwardly on the end of the housing 78 and has rigidly secured thereto by means of bolts 89, the clutch shifting arm 90, which extends laterally to a point directly above the clutch sleeve 58, and carries a clutch fork 91, which operatively engages the clutch sleeve 58, by means of the trunnions 92, which are carried by a thrust collar 93 rotatably mounted upon said clutch sleeve 58. Thus, by shifting the slide 86 in either direction from a central neutral position, the clutch sleeve 58 will be shifted along the shaft 45, into engagement with either the clutch member 68 or the clutch member 44, as the case may be.

Each of the other slides 87 and 88 carries corresponding clutch shifting arms 94 and 95 respectively, similarly secured thereto, by bolts 89, and extending transversely. The clutch shifting arm 94 extends downwardly in vertical alignment with the clutch sleeve 63, similarly engaging said clutch sleeve 63 by means of a clutch fork 96, and the trunnions 97, carried by the thrust collar 98. The clutch shifting arm 95 also extends transversely and to a point above the clutch sleeve 76 and engages the same by means of the fork 99, and the trunnions 100, carried by the thrust collar 101, in a manner similar to the engagement of the clutch sleeve 58. It is thus seen, that to complete any one of the several trains of gears hereinbefore described, it is merely necessary to shift any one of the several slides 86, 87 and 88 in either one of opposed directions, into one of their operative positions respectively.

In order to permit the shifting of the slides 86, 87 and 88, into either one of their two opposed operative positions at will, each of said slides is provided in the upper edge thereof, with a transverse recess 102, which in the central, neutral, or inoperative positions of said slides, are aligned with each other transversely, and also aligned with similar transverse recesses 103, in the stationary separator plates 83 and 84, intermediate of said slides 86, 87 and 88.

To the housing 18 is secured an upper casing member 104, enclosing the trains of gears, as well as the selective clutch shifting mechanism 77, as shown particularly in Figures 4 to 7 inclusive. The upper housing 104 is open at the top, directly above the clutch shifting mechanism 77, and is provided with the cap housing member 105, having mounted therein and extending therethrough in an upright direction, the selective clutch shifting handle lever 106. Thus, an opening 107 is provided in the top of the cap member 105, through which said lever may extend, and said cap member is further provided with horizontally aligned bearings 108, in which are journalled the horizontal trunnions 109, of the gimbal collar or annulus 110. In the gimbal collar or annulus 110, are similarly journalled, the horizontal trunnions 111 at a right angle to the trunnions 109, which trunnions 111 are rigidly carried by the handle or operating lever 106, thereby supporting said operating lever 106 in said gimbal collar 110 and said upper cap housing 105, in a pivotal manner, about the two right angularly disposed horizontal axes, thereby permitting the compound oscillation of said lever 106, about any axes in the horizontal plane of the gimbal.

Figure 1:
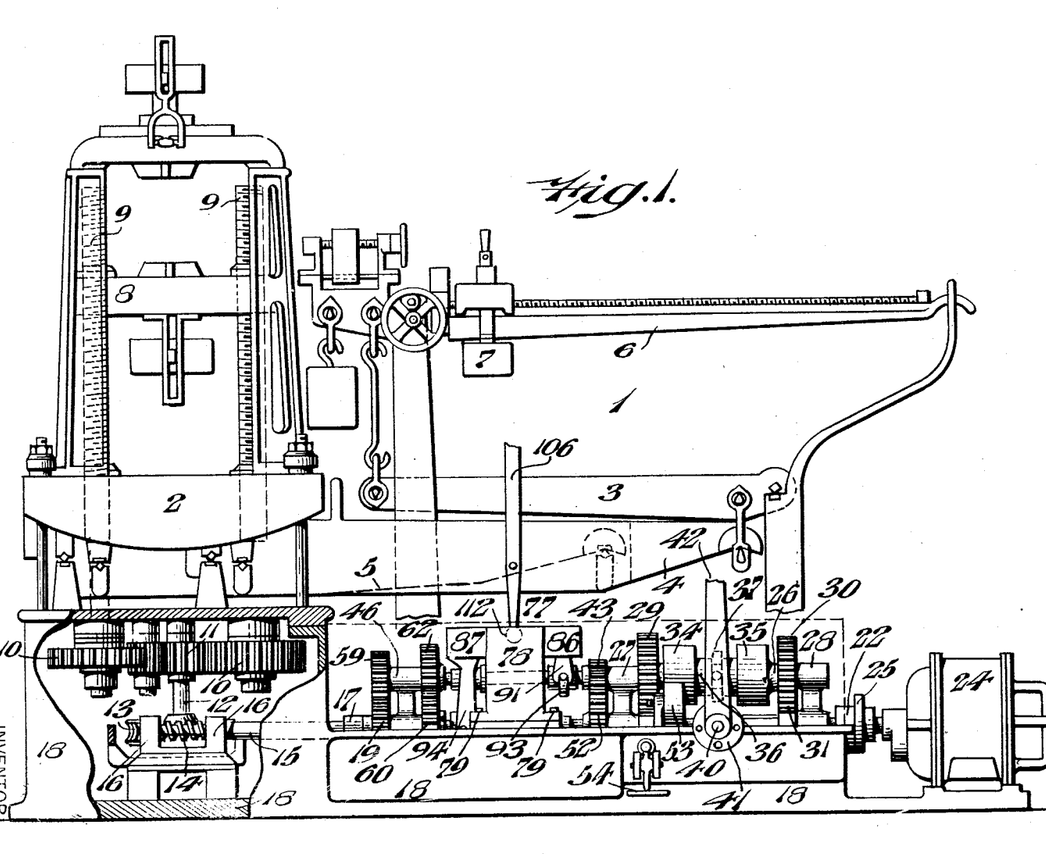
Figure 1 represents a front elevation of a testing machine embodying my invention with the lower housing broken away and omitted, to expose to view the interior construction.
Figure 2:
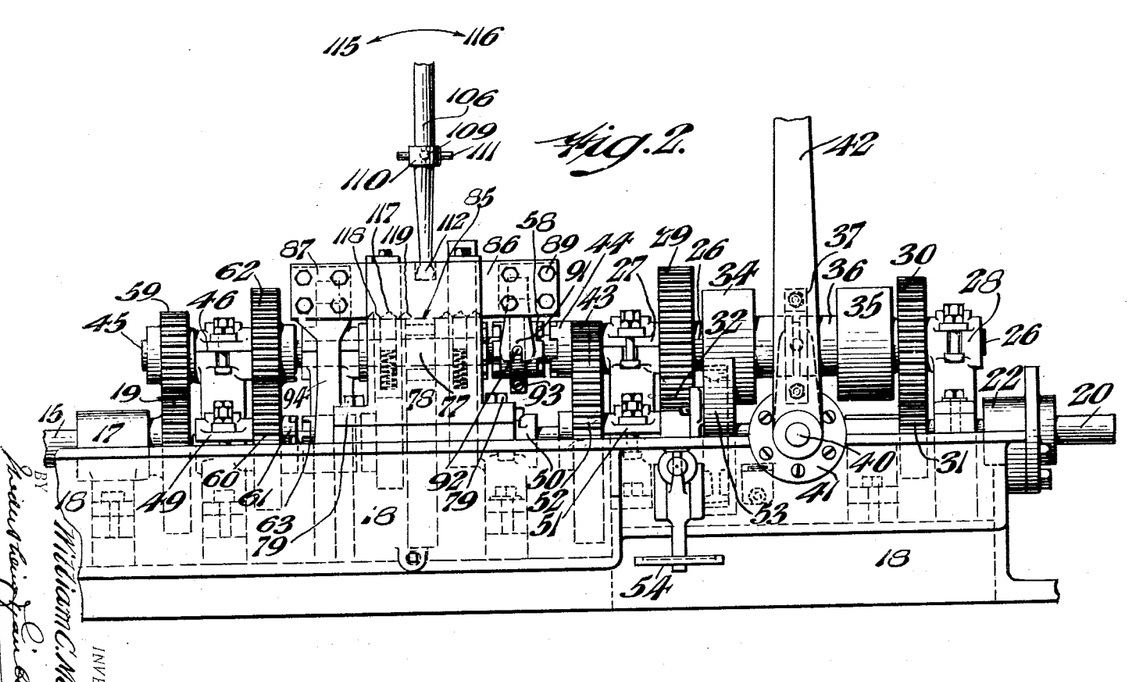
Figure 2 represents a front elevation on an enlarged scale, of novel transmission mechanisms shown in Figure 1.

The lower end of the lever 106 carries a terminal ball 112, of a suitable diameter, substantially the same as the width of the transverse recesses 102 and 103, in the slides 86, 87 and 88 and the stationary separator plates 83 and 84 respectively, and projecting into said transverse recesses, as shown particularly in Figures 2 and 7. Thus, by oscillating the lever 106 transversely in the direction of the arrows 113 or 114, as indicated in Figures 6 and 7, the terminal ball 112 may be positioned in any one of the recesses 102, in any one of the several slides 86, 87 and 88. In Figure 7, the terminal ball 112 is shown positioned in the central slide 86. By thus positioning the terminal ball 112, an engagement is obtained between the lever 106 and the particular slide 86, 87 or 88. When thus, engaged, the slide may be shifted longitudinally in either direction by oscillating the lever 106 in either one of the two opposite directions indicated by the arrows 115 and 116 in Figure 2, thereby effecting an engagement of the corresponding clutch sleeve 58, 63 or 76 respectively, in either of the respective directions. Due to the stationary separator plates 83 and 84 intermediate the slides 86, 87 and 88, having the corresponding transverse recesses 103, it is necessary to bring the terminal ball 112, and hence the particular recess 102 with which it is engaged into transverse alignment with the corresponding recess 103 of the stationary separator plates 83 and 84, in order to permit the disengagement of the ball 112 from any one of the slides 86, 87 and 88, and the subsequent engagement of the same with another slide, that is, in order to effect a transverse oscillation of the lever 106 in the direction of the arrows 113, or 114, (Figure 7) and a corresponding transverse movement of the ball 112. By this means, absolute safety of operation is insured, because it is impossible to effect an engagement of more than one clutch at any time, while all are operated by a single lever.

In order accurately to position each of the slides 86, 87 and 88, in each of their three positions respectively, to wit, their neutral and their two opposed operative positions, and in order yieldably to retain the said slides in either one of their three positions, each of said slides is provided in the lower edge thereof with a series of three accurately spaced conical or tapering notches or recesses 117, 118 and 119, corresponding to the neutral and to the two opposed operative positions respectively. A spring pressed plunger 120, is slidably mounted in corresponding vertical openings 121 in the housing of said selective clutch shifting mechanism 77, in operative alignment with each of the slide 86, 87 and 88. The plungers 120 are provided with corresponding tapering or conical upper ends, and are actuated from below by helical compression springs 122. Thus, upon shifting any one of the slides 86, 87 or 88 a suitable amount, the corresponding plunger 120, will engage one of the three tapering recesses 117, 118 or 119 and will thus draw accurately into position said slide in any one of the respective positions thereof; the neutral, or one of the two opposed operative positions. The spring pressed plunger 120, also serves the added function of yieldably retaining the slides in their three positions respectively, thus preventing any accidental displacement of a slide.

The slides 86, 87 and 88 are retained in the guide slots 80, 81 and 82 respectively, by means of a pair of transverse yokes or straps 123 and 124, superimposed thereon and secured to the top of the housing 78, by means of the bolts 125.

Having thus described my invention, what I claim as new and desire to secure by Letters Patent is:—

1. In a device of the character stated, a counter-shaft, a plurality of shafts, a single shaft intermediate said plurality of shafts, gears permanently interconnecting one of said plurality of shafts with said counter-shaft, an idle gear carried by said intermediate shaft, fixed gears carried by each of said plurality of shafts, permanently interconnecting each with the other, through said idle gear carried by said intermediate shaft, a clutch operatively interposed between said intermediate shaft, said idle gear carried by said intermediate shaft, and said counter-shaft, adapted operatively to interconnect said intermediate shaft with either said counter-shaft or said idle gear, permanently meshed fixed and idle gears carried by said intermediate shaft and each of said plurality of shafts respectively, and clutches intermediate each of said idle gears and each of said plurality of shafts, adapted operatively to interconnect said intermediate shaft with any one of said plurality of shafts.

2. In a device of the character stated, a counter-shaft, a plurality of shafts, a single shaft intermediate said plurality of shafts, gears permanently interconnecting one of said plurality of shafts with said counter-shaft, an idle gear carried by said intermediate shaft, fixed gears carried by each of said plurality of shafts, permanently interconnecting each with the other through said idle gear carried by said intermediate shaft, a clutch operatively interposed between said intermediate shaft, said idle gear carried by said intermediate shaft, and said counter-shaft, adapted operatively to interconnect said intermediate shaft with either said counter-shaft or said idle gear, a pair of idle gears of different diameters carried by each of said plurality of shafts, fixed gears on said intermediate shafts in mesh with each of said idle gears on said plurality of shafts, and a clutch on each of said plurality of shafts intermediate each of said pair of idle gears and said shafts.

3. In a device of the character stated, in combination a counter-shaft, a plurality of shafts, a single shaft intermediate said plurality of shafts, gears permanently interconnecting one of said plurality of shafts with said counter-shaft, an idle gear carried by said intermediate shaft, fixed gears carried by each of said plurality of shafts, permanently interconnecting each with the other, through said idle gear carried by said intermediate shaft, a clutch operatively interposed between said intermediate shaft, said idle gear carried by said intermediate shaft, and said counter-shaft, adapted operatively to interconnect said intermediate shaft with either said counter-shaft or said idle gear, a pair of idle gears of different diameters carried by each of said idle gears on said plurality of shafts, a clutch on each of said plurality of shafts intermediate each of said pair of idle gears and said shafts, and a single manually operable selective shifting device common to each of said clutches, coacting therewith and adapted operatively to engage any one of the same, said selective shifting device being engageable optionally in any one of a plurality of recesses formed in slidable elements coactingly connected to said clutches whereby a driving shaft may be rotated at predetermined variable speeds.

4. In a device of the character stated, a counter-shaft, a plurality of shafts, a single shaft intermediate said plurality of shafts, gears permanently interconnecting one of said plurality of shafts with said driven shaft, an idle gear carried by said intermediate shaft, fixed gears carried by each of said plurality of shafts, permanently interconnecting each with the other through said idle gear carried by said intermediate shaft, a clutch operatively interposed between said intermediate shaft, said idle gear carried by said intermediate shaft, and said driven shaft, adapted operatively to interconnect said intermediate shaft with either said driven shaft or said idle gear, permanently meshed fixed and idle gears carried by said intermediate shaft and each of said plurality of shafts respectively, clutches intermediate each of said idle gears and each of said plurality of shafts, adapted operatively to interconnect said intermediate shaft with any one of said plurality of shafts, and a single manually operable selective shifting device common to each of said clutches, coacting therewith and adapted operatively to engage any one of the same, said selective shifting device being engageable optionally in any one of a plurality of recesses formed in slidable elements coactingly connected to said clutches whereby a driving shaft may be rotated at predetermined different speeds and in a fixed ratio to the speed of said counter-shaft.

WILLIAM C. MORAN.